(12) United States Patent
Speer (10) Patent No.: US 6,315,963 B1
(45) Date of Patent: Nov. 13, 2001

(54) METHOD AND APPARATUS FOR THE ENHANCED TREATMENT OF FLUIDS VIA PHOTOLYTIC AND PHOTOCATALYTIC REACTIONS

(76) Inventor: Samuel E. Speer, 63 War Trophy La., Media, PA (US) 19063

( * ) Notice: Subject to any disclaimer, the term of this patent is extended or adjusted under 35 U.S.C. 154(b) by 0 days.

(21) Appl. No.: 09/533,419

(22) Filed: Mar. 22, 2000

(51) Int. Cl.[7] ............................. B01J 19/12; C02F 1/48
(52) U.S. Cl. ............................. 422/186.3; 210/748
(58) Field of Search ................ 422/186.3; 210/748; 502/2

(56) References Cited

U.S. PATENT DOCUMENTS 5,790,934 * 8/1998 Say et al. ..................... 422/186.3
6,037,289 * 3/2000 Chopin et al. ..................... 502/2
6,107,241 * 8/2000 Ogata et al. ..................... 502/350

* cited by examiner

Primary Examiner—Kishor Mayekar
Assistant Examiner—Thao Tran
(74) Attorney, Agent, or Firm—Massinger Law Office (57) ABSTRACT

A photolytic and photocatalytic reaction enhancement device comprising a fluid permeable fixed-substrate material preferably constructed of either pure titanium or tungsten or their alloys that is oxidized or anodized to form a titanium dioxide or tungsten oxide layer, respectively, or a corrosion-resistant metal alloy that can be coated with a photocatalyst. The substrate may be a glass, polymeric or ceramic composition containing micropores, channels or conduits which receive oxidizing, reducing and/or pH agents and is more generally comprised of a length of mesh or cloth-like material which is folded in accordion-shaped fashion. A plurality of panels are created by the folding, each being adapted with at least one aperture for the slidable reception of the UV light source there through. The subject device may be removably installed within conventional and more novel, commercially available UV chambers without modification thereof or the use of invasive mounting means.

16 Claims, 7 Drawing Sheets

METHOD AND APPARATUS FOR THE ENHANCED TREATMENT OF FLUIDS VIA PHOTOLYTIC AND PHOTOCATALYTIC REACTIONS

FIELD OF THE INVENTION

Ultraviolet (UV) reaction chambers are typically employed in the ultra-purification of water as well as in the conditioning of other fluids generally. Such "sanitization" or "disinfection" processes typically entail microbial destruction, total organic content (TOC) reduction, and ozone destruction. In the absence of a catalyst, these reactions are commonly referred to as photolytic reactions. Carried out in the presence of a catalyst, these reactions are known as photocatalytic reactions.

Photocatalytic reactions are heterogeneous or homogenous chemical reactions that take place on semiconductor surfaces in the presence of an energy source sufficient to overcome the Energy Gap of the semiconductor material to promote electron and hole mobility within the valence and conductance bands of the semiconductor material. Mobile electrons and holes react with chemical species in fluids to promote desirable alterations of those chemical species. Classical reactions take place in aqueous solutions where the semiconductor material produces hydroxyl and peroxide species to mineralize organic compounds to carbon dioxide, water, and inorganic acids. These "redox" reactions reduce metals from an oxidized state to a metallic form which are then absorbed onto a porous catalyst surface. In a much broader sense, such chemical processes are useful for the treatment or "conditioning" of fluids.

The subject invention relates generally to treatment of fluids via both photolytic and photocatalytic reactions, and to a method and apparatus for the enhancement of said fluid treatment, in particular. More specifically, the subject invention relates to a novel substrate capable of insertion into existing UV reaction chambers to enhance photolytic reactivity, and to the selection and application of photocatalytic materials onto said substrate to enhance photocatalytic reactivity.

BACKGROUND OF THE INVENTION

Photocatalysis belongs to the family of Advanced Oxidation Processes (AOP) that utilize an oxidant species to break carbon bonds with other carbon atoms, nitrogen, chlorine, sulfur, fluorine and other elements. The array of species that have been affected by photocatalysis in laboratory studies include, inter alia, simple organic compounds, chlorinated organic compounds, petroleum products, municipal wastewater, metal-containing photographic by-products, bacteria and viruses.

AOPs can either use an oxidant alone, or may be used in conjunction with a catalyst to promote its desired effect. Common stand-alone AOPs for the purpose of treating aqueous fluids are ozonation and combustion. Catalytic AOPs include hydrogen peroxide and a metal in the presence of ultraviolet (UV) light to promote hydroxyl radicals. This combination is commonly referred to as Fenton's Reagent. UV, at times, is considered an AOP. There are documented processes that utilize UV with ozone, or with hydrogen peroxide for the purpose of treating water and wastewater for organic destruction and disinfection.

Photocatalysis is an AOP based on a solid semiconductor material that is bombarded with UV radiation to excite the electrons and holes within the semiconductor material to produce oxidation-reduction (redox) reactions.

Two methods of photocatalysis have been suggested in literature. The first concerns the formation of free radicals. Electron-hole pairs migrate to the surface of the catalyst and react with hydroxyl ions (OH•) and dissolved oxygen ($O_2$) to form hydroxyl radicals (OH.) in solution. Hydroxyl radicals then react with organic substrates in the fluid to oxidize them. Hydroxyl radicals have the highest oxidizing strength of common oxidizing species such as ozone, peroxide, and chlorine-based compounds.

The second method, a method most widely confirmed, is similar with electron, hole and hydroxyl reactions, but they take place on the catalyst surface with the absorbed organic species. As discussed, there are redox reactions taking place. At the anodic area (oxidizing) of the catalyst, holes are reacting with water to create hydroxyl radicals, and the organic species and their intermediate products. At the cathodic area (reducing) of the catalyst, the electrons are reacting with the oxygen to reduce it to the superoxide species, which in turn reacts with holes to assist in the organic matter oxidation. Precious metals that are metallized to the semiconductor (in areas not illuminated) aid in the reducing reactions at the cathodic area. It has also been shown in literature that precious metals act as oxidizers when in the illuminated area of the catalyst.

The art is often described in terms of either a suspended/slurried photocatalyst or a fixed photocatalyst. Suspended catalysts are those utilizing fine particles of a semiconductor material, generally to increase catalyst surface area. U.S. Pat. No. 5,589,678 (Butters, et al) provides a description of photocatalytic slurries. Suspended catalysts are limited to maximum concentrations in the fluid since they (1) increase turbidity, (2) absorb light, and (3) refract light, thus decreasing overall UV transmission in an illuminated reactor.

Fixed catalysts, to which the subject invention are directed, employ a singular or multi-pieced support or substrate to which the photocatalyst is applied. Fixed catalysts have been perceived as having less overall catalyst surface area then suspended catalysts, but do not require removal and recovery of the suspended catalyst particles. An example of a fixed catalyst support design is presented in U.S. Pat. No. 5,790,934 (Say et al). The Say invention utilizes multiple fins located in a radial or longitudinal arrangement and suffers from various shortcomings and limitations. First, the fixed substrate fins are situate at a certain distance away from the UV source. Reactivity is greatest in close proximity to the light source and decreases with distance. Also, the apparatus may not be inserted into existing UV chambers, nor allow for cleaning of the UV sources without removing the apparatus.

U.S. Pat. No. 5,126,111 (Al-Ekabi et al) provides a fiberglass mesh design, however, again it is located at a distance away from the UV source, cannot be inserted into commercial UV chambers, nor compress and expand to allow for UV source cleaning. Further, this invention requires the UV spectra to be in the range of 340–360 nm that is outside the capability of standard bulb designs, i.e. 185 nm and 254 nm. Other mesh designs are illustrated in U.S. Pat. No. 4,892,712 (Robertson et al) and U.S. Pat. No. 5,766,455 (Berman et al). Neither of these designs allow for close contact with the source or permit compression and expansion within a standard UV chamber.

Some fixed catalyst substrates have been proposed to increase overall catalyst surface area through catalyst absorption onto silica gel, zeolites, carbon black, and porous metals, however, the micropores of these fixed catalysts may not allow sufficient illumination to penetrate for efficient catalyst activation. Also, these materials are packed into a reactor where proper illumination of some surfaces of a majority of the catalysts may not be accomplished.

U.S. Pat. No. 5,501,801 (Zhang, et al) illustrates the use of silica gel and zeolite substrates as photocatalytic supports.

Another fixed substrate design is the use of titanium metal pieces (rods, spheres, beads, chunks, and the like) that are oxidized to form the desired titanium dioxide layer. As discussed in U.S. Pat. No. 5,868,924 (Nachtman, et al) and U.S. Pat. No. 5,395,552 (Melanson, et al), titanium metal, or its alloys, are inserted into a UV chamber along the length of the UV source, at a distance away from the UV source.

A replaceable coated cartridge is presented in U.S. Pat. No. 5,736,055 (Cooper) that provides a design for a replaceable piece in a photocatalytic reactor that combines a flexible photocatalytic surface with a rigid base. Again, the inner photocatalytic surfaces of the cartridge are at a distance away from the UV source(s) and are not readily adjustable to facilitate maintenance of the UV source(s).

Based on the above prior art, there has clearly been demonstrated an effort to enhance photocatalysis through, among other things, development of novel fixed-catalyst substrates. As will become apparent upon review of the detailed description below, Applicant has developed a new and improved fixed-catalyst substrate with several advantages heretofore unobserved.

Another means of enhancing photocatalytic reactivity involves the use of various oxidants, reducing agents and pH control agents. U.S. Pat. Nos. 5,126,111 (Al-Ekabi, et al), 5,779,912 (Gonzalez-Martin, et al), 5,863,491 (Wang), and 5,554,300 (Butters, et al) discuss the use of oxidants or reducing agents, or both, to promote photocatalytic reactions. Oxidizing and reducing agents act as hole and electron scavengers, respectively, to preclude electron-hole recombination that reduces photocatalytic efficiency. pH control agents are introduced to shift the reduction potential of the fluid to selectively oxidize/reduce targeted chemical species.

The method of injection of such agents into fluid treatment processes has been presented as general in nature, namely the injection into a fluid stream upstream of a reactor and the provision of sufficient motive force to allow mass transport to the catalyst surface. As previously mentioned, the photocatalytic reactions have been commonly observed to occur at the catalyst surface. It is therefore desirable to provide a photocatalytic reaction enhancement device which allows injection of an oxidant, reducing agent, or pH control agent, alone, or in combination with one and other, in direct proximity of the photocatalyst surface(s) for purposes of increasing fluid treatment efficiency. The subject invention is capable of enhancing photocatalytic reactivity through the employment of such means.

SUMMARY OF THE INVENTION

The subject invention relates to the selection and application of photocatalytic materials as an adherent coating onto a novel substrate for subsequent use in existing UV reaction chambers for the enhancement of fluid treatment processes. The photocatalytic reaction enhancement device of the subject invention comprises in general, a catalyst coated, fluid permeable fixed-substrate material preferably constructed of either pure or alloyed form of titanium or tungsten that is oxidized or anodized to form a titanium dioxide or tungsten oxide layer, respectively, or a corrosion-resistant metal alloy that can be coated with a photocatalyst. In another preferred embodiment, the substrate may be a glass, polymeric or ceramic composition adapted with micropores, channels, or conduits to allow for injection and receipt of oxidizing, reducing and/or pH agents.

The catalyst itself will be of semiconductor material such as $TiO_2$, $WO_3$, $Fe_2O_3$, or titanate-based materials compatible with the process and may be metallized. Methods of applying the catalyst to the substrate surface are also disclosed.

The novel structure and configuration of the substrate each serve to optimize both photocatalyst surface area and turbulence of the target fluid medium within the maximum UV illumination area of the reaction chamber, thereby enhancing photocatalytic reactivity when the surface of the substrate is subjected to a light source containing UV spectra in the 100–400 nm wavelength band. The fixed-catalyst substrate is generally comprised of a length of mesh or cloth-like material which, in the preferred embodiment is folded or "pleated" in accordion-like fashion. A plurality of panels are created by the folding, each being adapted with a centrally located aperture for slidable reception of the UV light source there through. The edges of each aperture may be optionally modified with a special coating to prevent damage to the scratch-prone outer surface of the UV source as well as actually clean the surface through manual contraction and extension of the accordion-like substrate. Alternatively, a UV transmissive sleeve may be employed between the UV source surface and the subject invention. The subject device may be removably installed within conventional and more novel, commercially available UV chambers without modification thereof or the use of invasive mounting means.

Use of subject apparatus within an existing UV chamber increases its fluid treatment efficiency, predictably by at least 25%, without any other process or hardware modifications. The subject invention also increases efficiency of other treatment means downstream of the reaction vessel. More particularly, ion exchange resin systems are frequently placed downstream of UV chambers in water ultra-purification systems. Ion exchange resin performance is a function of temperature; as temperature increases, performance decreases. In the upstream reaction chamber, UV light produces heat which increases the temperature of the treated water. When the subject apparatus is used within existing UV chambers, less energy is required to perform a desired level of treatment. The energy requirement is reduced through either a reduction in the either the number or intensity of UV sources, or both. Because the effluent temperature within the upstream UV chamber is lowered, the efficiency of the downstream ion exchange resin system is increased.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide a device capable of enhancing photocatalytic reactions within a reaction chamber by situating the catalyst substrate material as close to the illumination source as possible.

It is another primary object of the subject invention to provide a device capable of enhancing photocatalytic reactions within a reaction chamber by exposing the maximum catalyst surface area possible to illumination.

It is another object of the subject invention to accomplish the above tasks through both the structural design of the catalyst substrate component of the subject device as well as through its overall configuration relative to the UV source.

Another important object of the subject invention is to accomplish the above tasks without sacrificing fluid flow rate through or motive force within the reaction chamber, or impeding system performance via fouling.

It is also an object of the present invention to provide a method and device capable of enhancing photolytic and photocatalytic reactions which are practical for industrial applications without the utilization of more expensive, non-standard UV chambers and which provide for in-service cleaning of UV sources.

It is another object of the present invention to provide a relatively inexpensive, but efficient device capable of enhancing photolytic and photocatalytic reactions within a variety of commercially available reaction chambers.

Still another object of the present invention is to provide a photolytic and photocatalytic reaction enhancement device capable of easy insertion within existing UV reaction chambers without invasive installation means or modification of the chamber.

Yet another object of the present invention is to provide a photocatalytic reaction enhancement device which allows injection of an oxidant, reducing agent, or pH control agent, alone, or in combination with one and other, in direct proximity of the photocatalyst surface(s) for purposes of increasing fluid treatment efficiency.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
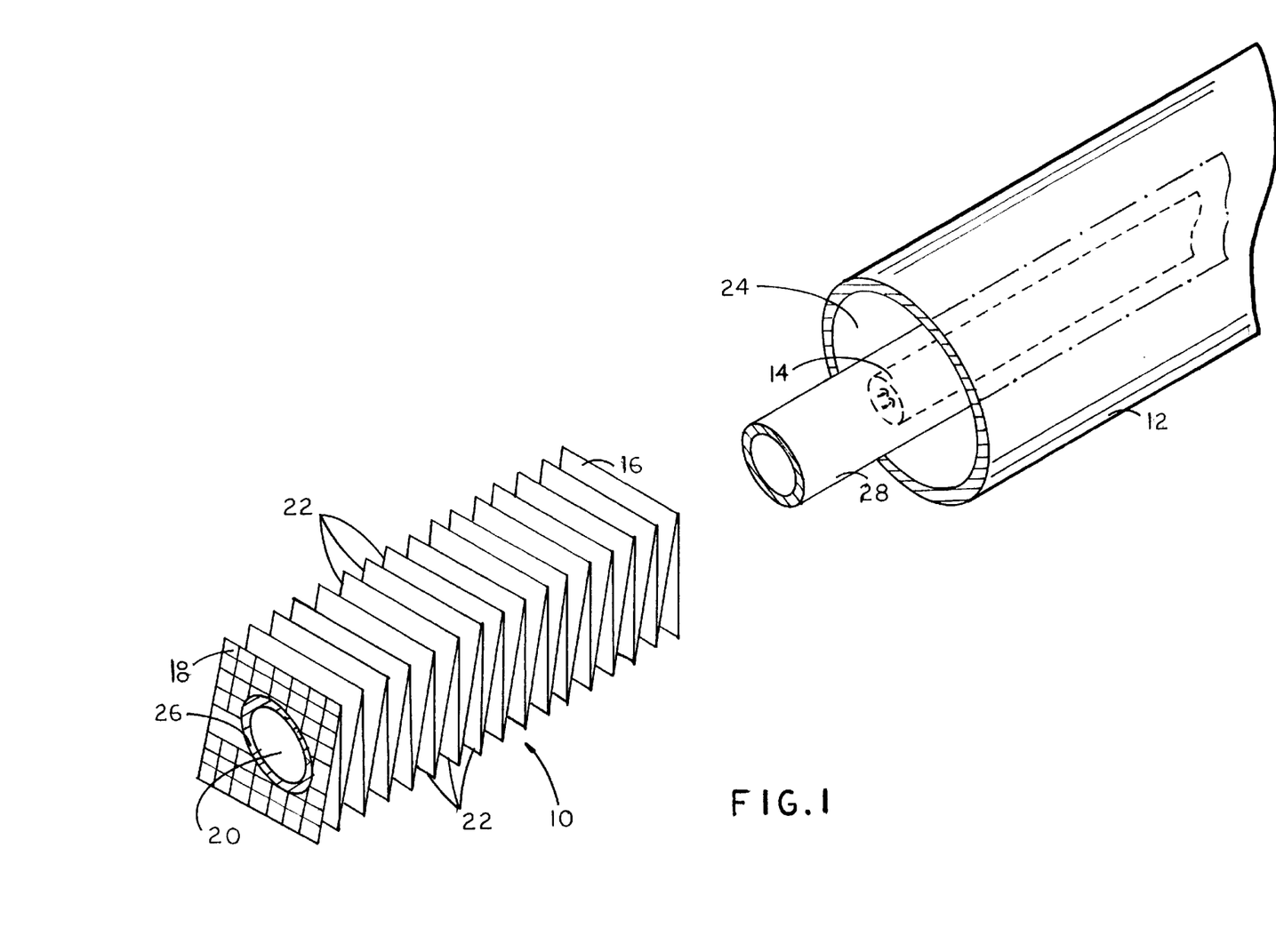
FIG. 1 is an exploded view of the apparatus illustrating how it is placed together and inserted into a conventional UV reaction chamber.
Figure 2A:
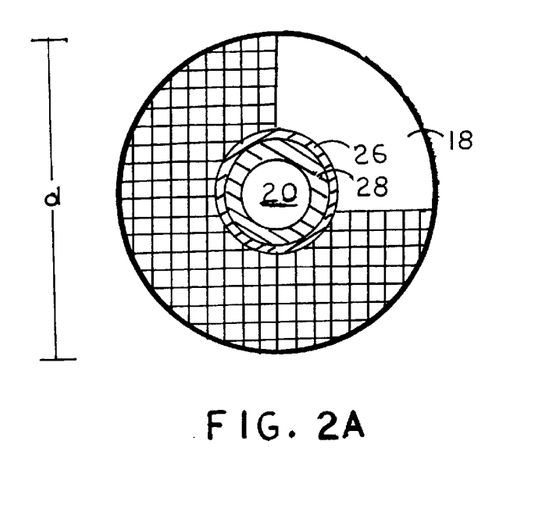
FIGS. 2A–2D are plan views of the substrate panels illustrating circular, square, multi-angular and rectangular embodiments, respectively.
Figure 2B:
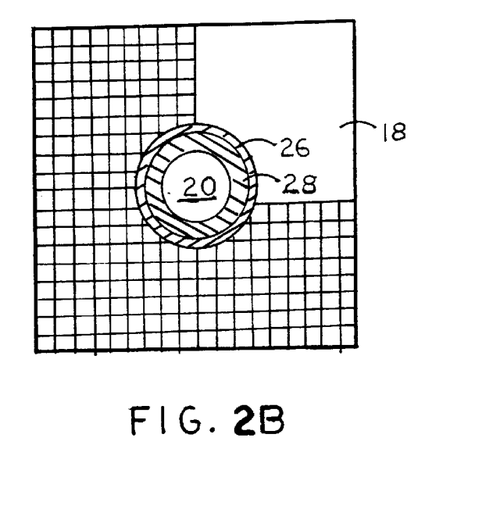
Figure 2C:
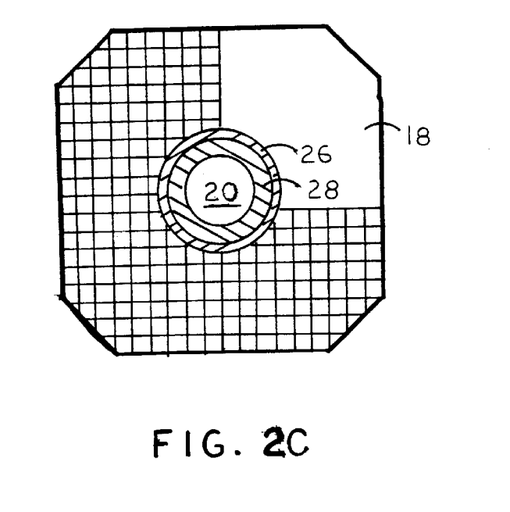
Figure 2D:
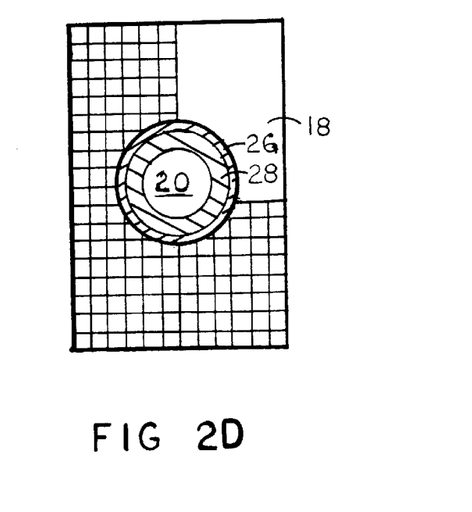

Reference is now made to FIG. 1 wherein the subject photocatalytic reaction enhancement device is depicted and designated generally by reference numeral 10. The subject device 10 is intended for installation within a conventional UV reaction chamber 12 which houses a UV source 14. The UV light sources applicable to this invention are, among others, low-pressure and medium pressure bulbs, broadband pulsed zenon, narrow-band excimer, pulsed electric field, black light and fluorescent light that provide an UV spectra in the 100–400 nm range. In the instant case, UV source 14 is a UV bulb. The subject apparatus is uniquely designed to be removably installed into conventional and other existing UV reaction chambers without modification thereof and without the use of invasive mounting means. Neither chamber 12 nor UV source 14 form a part of the invention.

The photocatalytic reaction enhancement device of the subject invention comprises in general, a length of catalyst coated, fluid permeable fixed-substrate material 16. With regard to its composition, any or combinations of a metal, ceramic, glass or polymeric material are appropriate. There are two preferred compositions. The first is a metallic substrate that is either pure or alloyed form of titanium or tungsten that is oxidized or anodized to form a titanium dioxide or tungsten oxide layer, respectively, or a corrosion-resistant metal alloy that can be coated with the photocatalyst. Examples of corrosion resistant metals include aluminum, stainless steel (300 and 400 series), nickel, tantalum, titanium and zirconium.

The second preferred composition is a glass, polymer or ceramic composition modified with micropores, channels, or conduits to allow for fluid injection (FIG. 6). When an oxidizing, reducing agent, or pH control agent supply is connected to the apparatus, the agent can be introduced at the photocatalytic surface to provide more efficient mass transfer and chemical reactions. Also, a glass, ceramic or other UV transmissible substrate 16 allows for light diffraction throughout its geometry to provide additional UV transmission to the catalyst surfaces, thus enhancing the photocatalytic reactions. Typical oxidants are air, oxygen, ozone and persulfate. Reducing agents can be organic solutions/gases or metal-containing solutions/gases. Preferred reducing agents are organic based acids that provide the reducing capability of metals in the redox reactions, while lowering pH in the solution.

The novel structure and configuration of the substrate each serve to optimize both photocatalyst surface area and turbulence of the target fluid medium within the maximum UV illumination area of the reaction chamber, thereby enhancing photocatalytic reactivity when the surface of the substrate is subjected to a light source containing UV spectra in the 100–400 nm wavelength band. Structurally, substrate 16 may be a plain, twill, or micron woven mesh, a filter cloth, extended metal grating, perforated panels or an aggregate of chopped fibers impregnated in a polymer, ceramic, or glass. The preferred morphologies are the plain or twill weaves because their grid-like mesh structure is conducive to more uniform application of the photocatalytic coating composition, and their relatively large open areas maximize UV illumination within the chamber 12 while minimizing inorganic and organic matter fouling. The permeable nature of substrate 16 causes changes in fluid dynamics to induce turbulence within the illumination area of the chamber. Increased turbulence promotes better mass transfer of the species in the bulk medium being treated onto the substrate surface, thus allowing for more intimate contact with the catalyst, but does not induce pressure drop or induce fouling of the apparatus due to the relatively large open areas of the substrate. Preferred mesh sizes range from USS 4×4 to 400×400. The design may also include alternating mesh sizes to induce better mass transfer or to enhance structural support.

With regard to overall configuration, substrate 16 is cut to an application-specific length and then folded in accordion-like fashion to form a plurality of panels 18 connected in series. Each panel 18 is adapted with at least one aperture 20 for the slidable reception of UV source 14 there through. Accordingly, each aperture 20 is sized to snugly accommodate the diameter of the UV source. Some reaction chambers use more than one light source (i.e. multiple bulbs). It should be appreciated that each panel may include multiple apertures to receive the multiple light sources there through. For instance, if a chamber employs four UV bulbs, each panel 18 may have four corresponding apertures 20 oriented to receive the bulbs.

Each panel 18 has top and bottom edges 22 created by the folding which serve as hinges to permit slidable adjustment of the substrate along the length of UV source 14. As indicated above, substrate 16 may be comprised of a variety of materials. In some instances, the composition may be too rigid or brittle to permit folding. In such instances, individual panels 18 may be formed by cutting and then joined to one and other via hinge or other connection means. Alternatively, the panels may remain independent of one and other and incrementally or randomly spaced along the length of the UV source. Some applications of the subject device may call for a more rigid composition. For instance, a more rigid composition may be desired, particularly with high fluid velocities that would otherwise distort the substrate's shape or disturb its positioning relative to the UV source. A more flexible composition may be preferred to facilitate cleaning of the UV source while in-service (see below).

Each panel 18 can be cut, molded or otherwise shaped into any geometric configuration that either fits the contour of the interior surface 24 of UV chamber 12, or produces the best efficiency of mass transfer. Examples are depicted in FIGS. 2A through 2D and include a circle, a square, polyhedron and rectangle, respectively. Each panel 18 of substrate 16 may be shaped with a different geometry to accommodate irregular interior surfaces of UV chambers such as those which employ internal baffles (not shown). The longest distance d of each panel 18 should be slightly less then the interior diameter of the UV chamber to avoid physical contact between the two since said surfaces may be prone to scratching.

Referring once again to FIG. 1, the edges of each aperture 20 may be optionally modified with a collar 26 to prevent damage to the scratch-prone outer surface of the UV source as well as to actually clean the surface as described in greater detail below. Alternatively, a UV transmissive sleeve 28 may be employed between the surface of UV source 14 and the subject invention.

Collars 26 are constructed of a glass, composite, or polymeric material that is preferably UV, photocatalytic, and heat resistant, while not inducing sufficient friction to cause abrading of sleeve 28 or UV source 14. Examples include teflon, PVDF, acrylic and silica. The material should also preferably provide for UV transmission. Collars 26 may also act as cleaning tools that produce a "squeegee-like" effect as they ride along the length of UV source 14 or sleeve 28 during manual contraction and extension of substrate 16. As collars 26 travel across the UV source surface, they loosen scaling and organic material build-up.

Sleeve 28 may be a continuous design along the entire length of the apparatus, or constructed of smaller individual pieces. The materials of construction of the sleeve should allow at least 85% UV transmission, particularly in the range of 100–400 nm. The materials should also be heat and UV resistant. Example materials are quartz glass, silica glass or silicon dioxide, polyvinlydiene (PVDF), and acrylic.

Figure 3A:
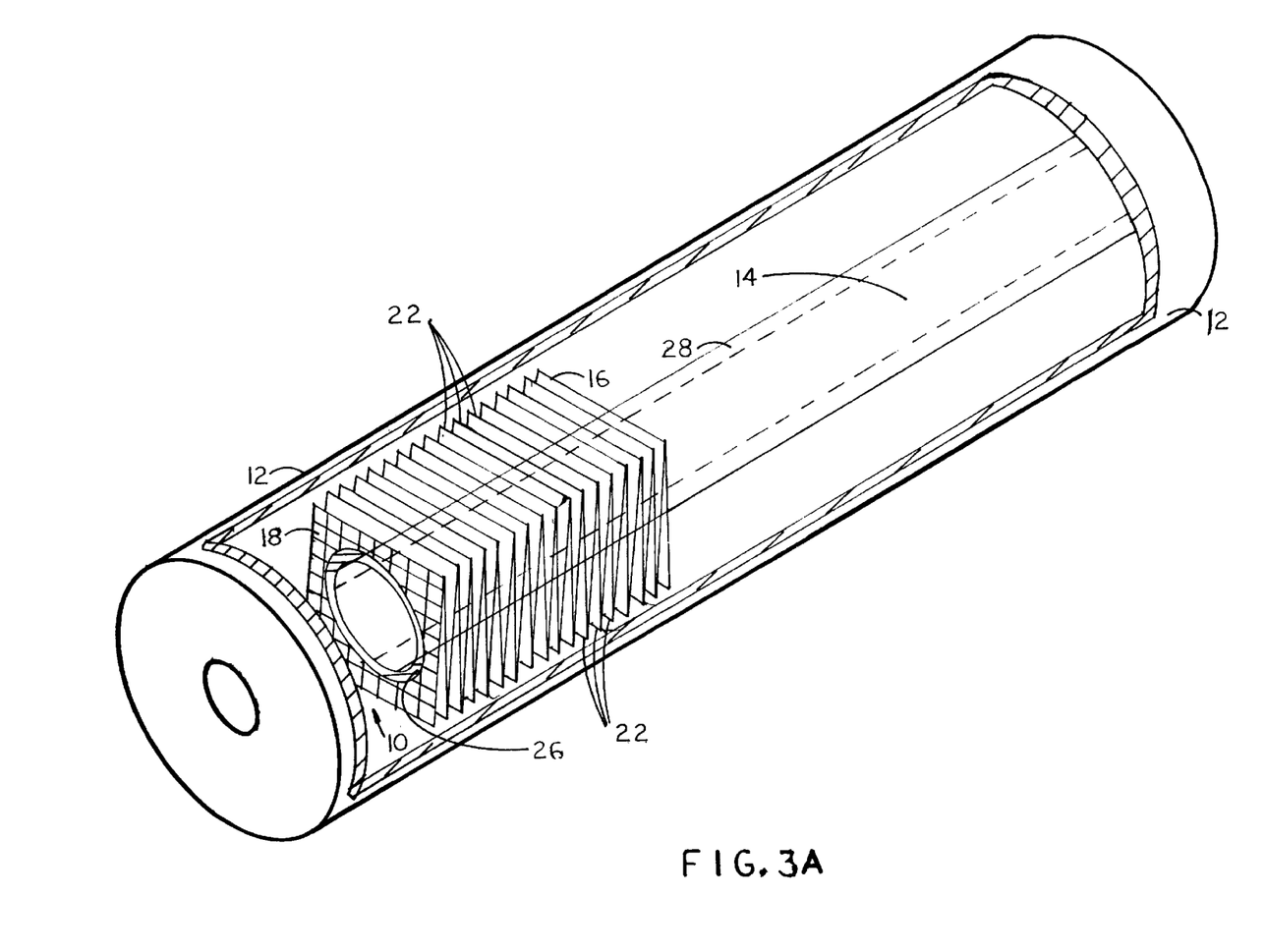
FIG. 3A is a perspective view of the subject apparatus in its contracted configuration as installed over a UV source which in turn is contained within a conventional UV reaction chamber, portions of which are illustrated in phantom and cut-away view to better depict the invention.
Figure 3B:
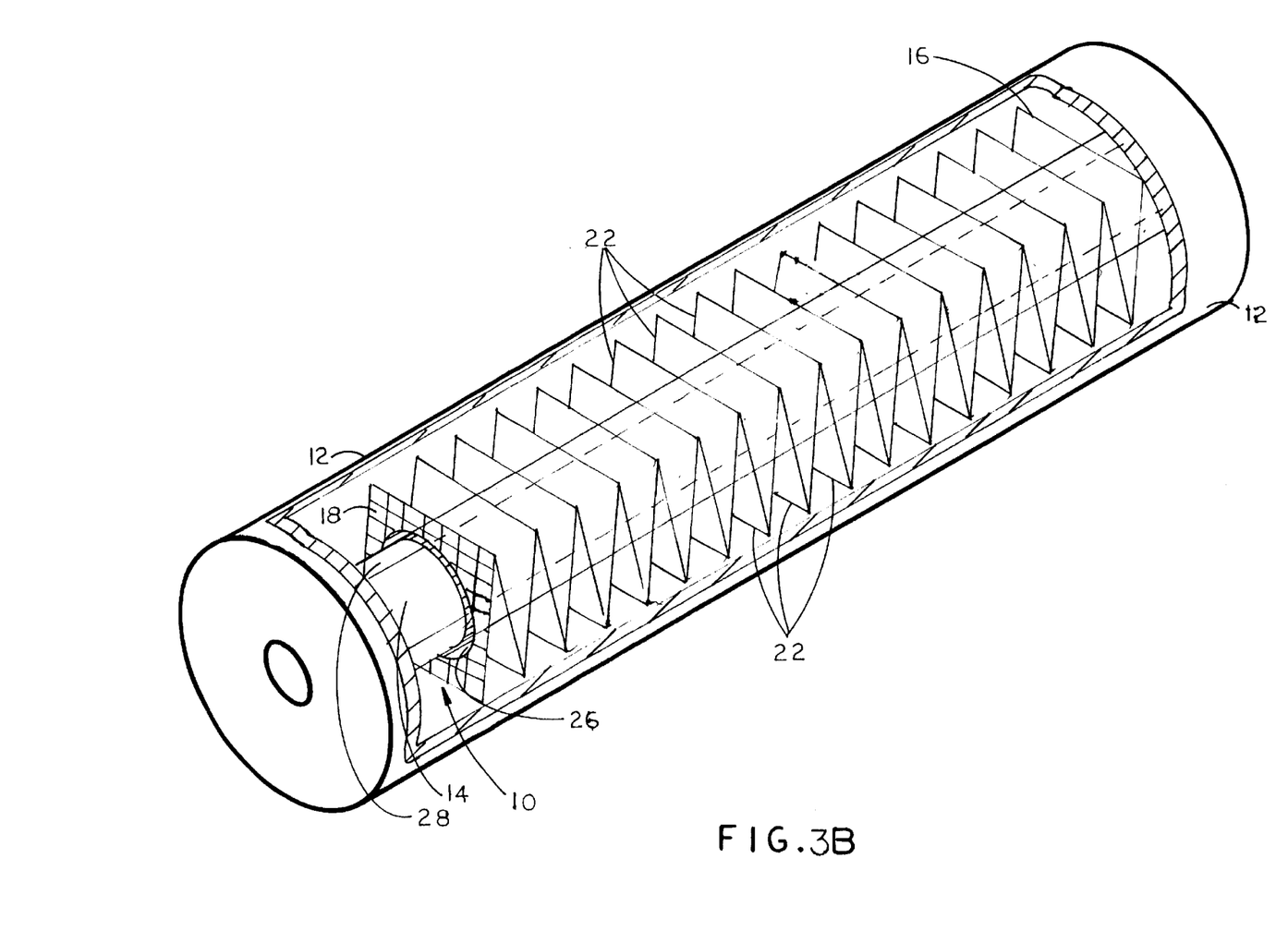
FIG. 3B is a perspective view of the invention in its extended configuration.

FIGS. 3A and 3B depict the subject device 10 in contracted and extended configurations, respectively. It may by readily appreciated that surface area of substrate 16 is proportionate to the number of panels present over a given length of the UV source. Surface area increases as the number of panels over said length increases. Over-contraction of the accordion-like substrate, however, may impede fluid flow through the system. Additionally, over-contraction will reduces penetration of UV light onto the front and back surfaces of each panel 18. It is therefore desirable that each panel 18 be oriented for maximum penetration of UV light onto its surfaces. A range of approximately six to ten (6–10) panels per linear inch of UV source is preferred. Alternatively, proper panel orientation may be determined relative to the UV source surface. Angles approximating 55–80 degrees relative to the UV surface are preferred (FIG. 3B) although this range may vary ±10 degrees.

Figure 4:
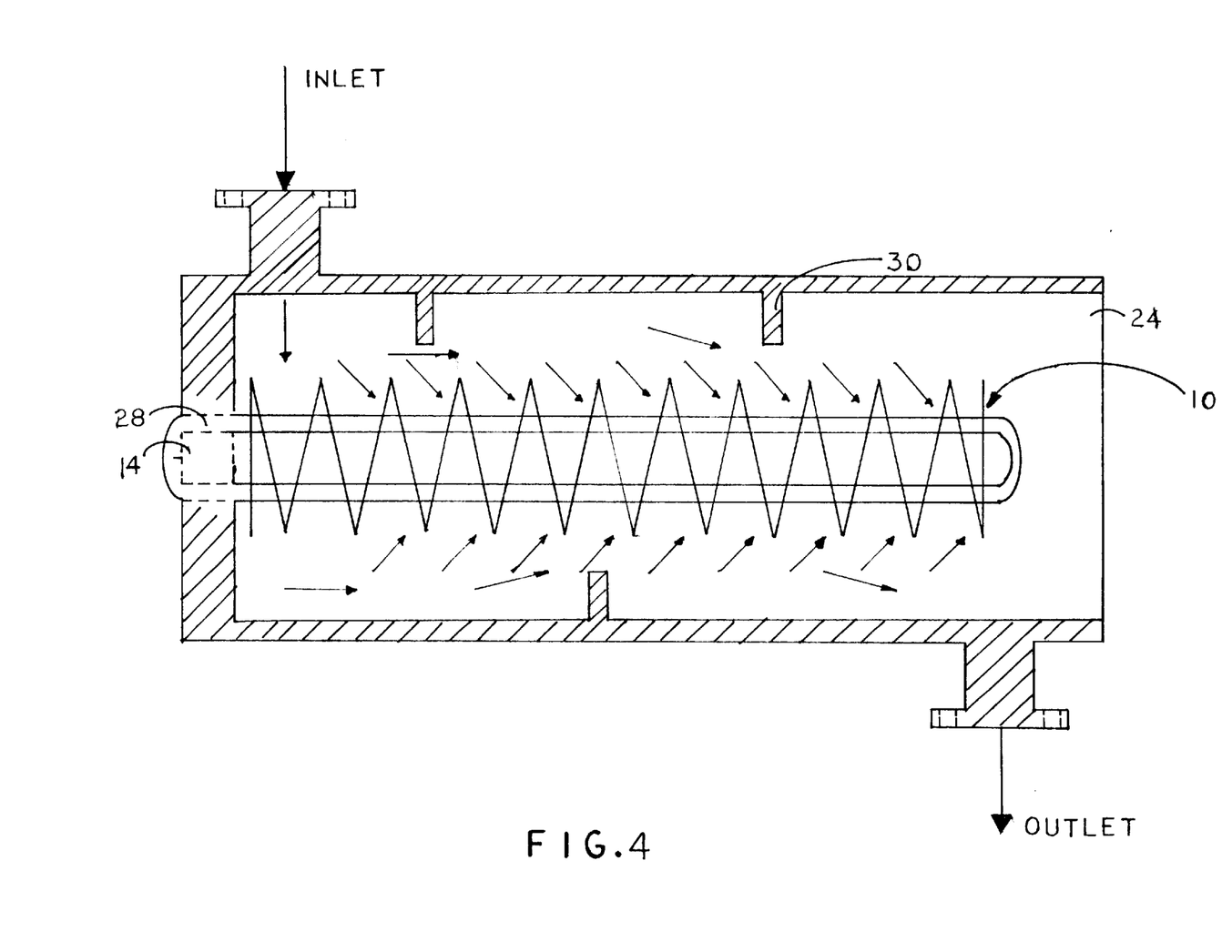
FIG. 4 is a sectional side view of the subject apparatus installed within a conventional UV reaction chamber and illustrating the path of incoming fluid and how it comes into contact with the subject device.
Figure 5:
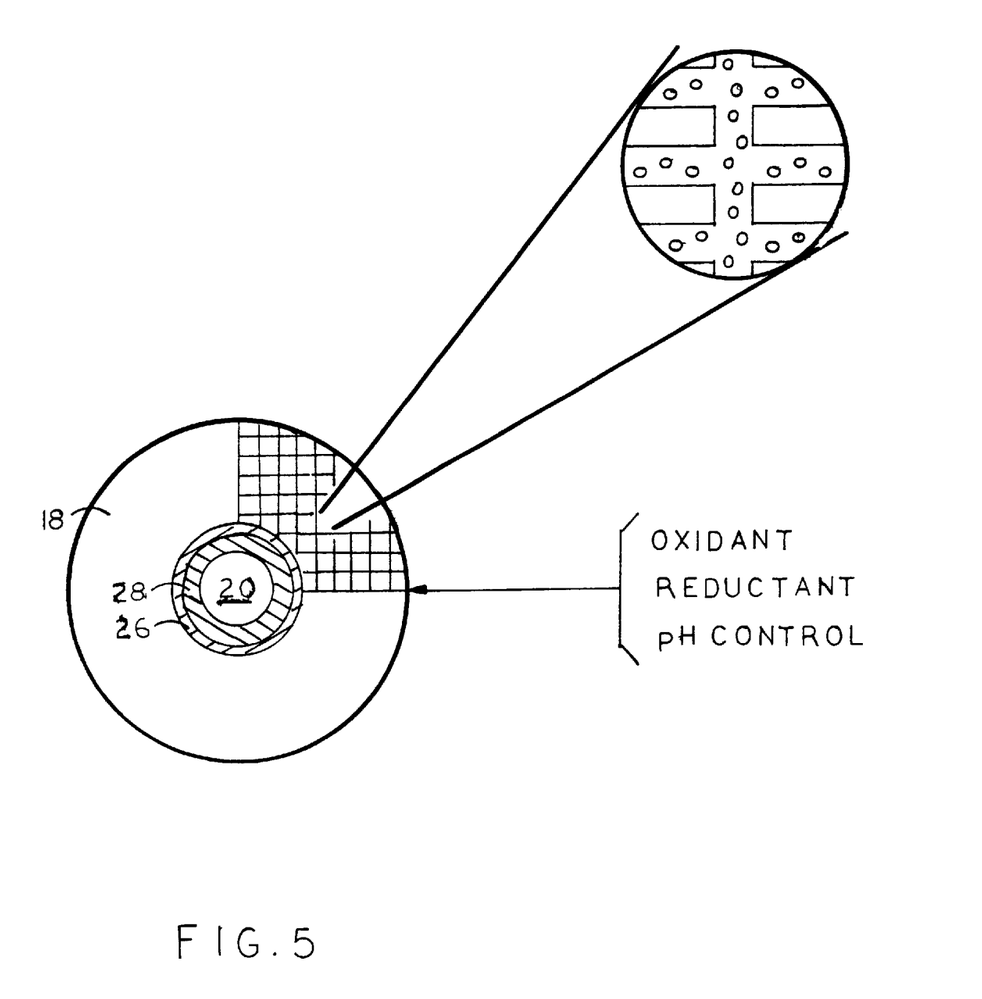
FIGS. 5A and 5B are cross-sectional views of the subject apparatus modified with turbulence enhancement members.

Referring now to FIG. 4, a main objective of the subject device is to increase catalyst surface area in the locale of the highest available UV illumination intensity (closest to the bulb or other UV source). The structure and configuration of substrate 16 also assist mass transport of the chemical species in the fluid to catalyst surface due to induced turbulence caused by fluid flow interruptions. While not intended to be a detailed depiction of the fluid dynamics within the chamber 12, FIG. 4 does generally illustrate the path of fluid flow therein. The angulated configuration of substrate 16 acts to "pull" fluid in towards the surface of UV source 14 where light intensity is believed to be the greatest.

Internal baffles 30 may also assist in this regard and increase turbulence. Organic material build-up on UV source(s) 14 should be minimized by the subject device. Because catalyst-treated substrate 16 is directly proximate to UV source(s) 14, reactivity (elimination) of the organic material on the source is enhanced. As should readily be apparent, the use of substrate 16 alone (without a catalyst) will also enhance photolytic reactivity.

Figure 6A:
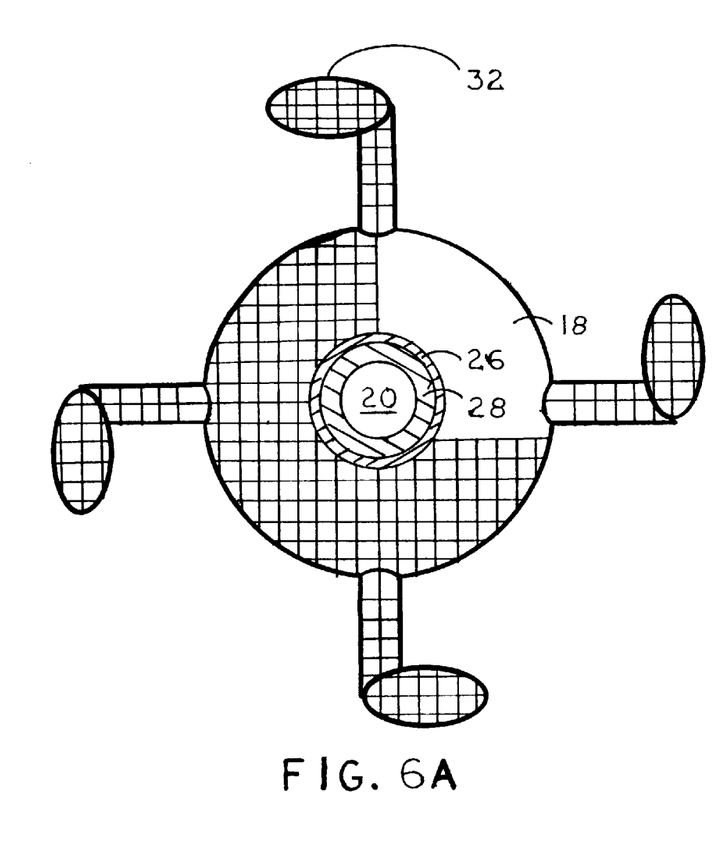
FIG. 6 is a cross-sectional view of a porous catalyst substrate having pores to distribute oxidant, reducing agent or pH control agents which are injected onto the substrate surface.
Figure 6B:
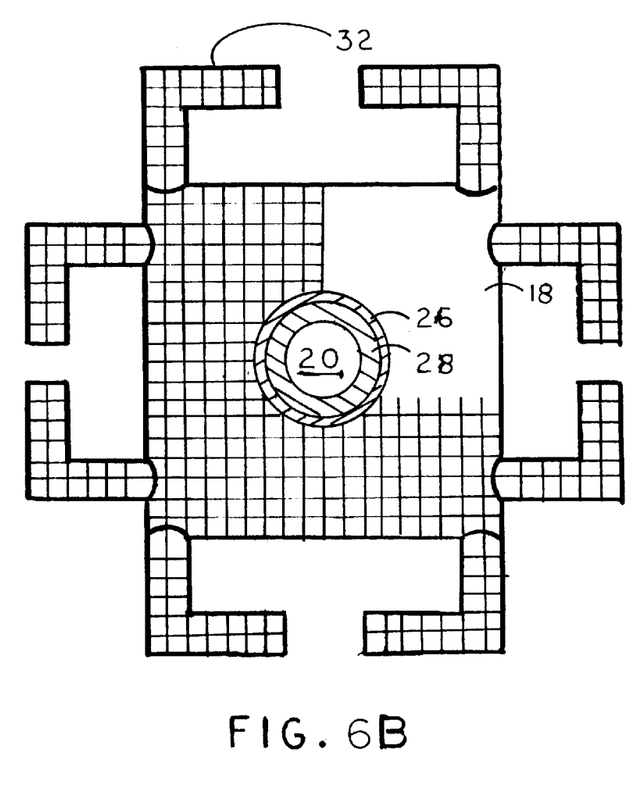

Attention now being invited to FIGS. 6A and 6B, substrate 16 may be further modified to provide increased turbulence within the chamber, beyond that provided by the permeable structure of the substrate and its angulated configuration. A plurality of turbulence enhancement means 32 are attached to or integrally formed with substrate 16. These curved or bent extension arms project outwardly from the substrate's edges to cause swirling effects that direct fluid from the outer edges of the reactor into its middle, in closer proximity to UV source 14, thereby mimicking a static mixer. Turbulence enhancement means 32 may be situated within the same plane as the panel from which they extend and/or may be bent forward or rearward out of plane. The object is to facilitate "pulling" of fluid towards the surface of the UV source(s) where their energy levels are the highest.

The catalyst formulation is based on a semiconductor material whose Energy Gap, Eg, is within the range of typical UV spectra, namely between 100–400 nm. The catalyst will be of a semiconductor material such as $TiO_2$, ZnO, $WO_3$, CdS, $Fe_2O_3$, $MnO_2$, $CeO_2$, CuO, or various titanate-based compounds compatible with the process ($RTiO_3$ compounds where R is Sr, Ba, Ca, Al or Mg) and may be metallized with any individual or combination of the following metals, Pt, Pd, Au, Ag, Re, Rh, Ru, Fe, Cu, Bi, Ta, Ti, Ni, Mn, V, Cr, Y, Sr, Li, Co, Nb, Mo, Zn, Sn, Sb or Al. These metals enhance the photocatalytic reactions by either reducing or oxidizing species to their desired form such as, for example, reducing oxygen to peroxides. In addition to, or as an alternative to metallizing the semiconductor, the catalyst may also be doped with any individual or combination of f-Transition elements of the Lanthanide or Actinide series such as Ce, La, Nd and Gd to stimulate the redox reactions.

The preferred combination of photocatalyst is comprised of titanium dioxide ($TiO_2$), platinum (Pt), cerium (Ce), and lanthanum (La). When $TiO_2$ is selected, its composition should be 50% or greater concentration of anatase titanium dioxide crystal, preferably 70–100%, with the balance either rutile and/or amorphous. The preferred Pt, Ce, and La concentrations are 1–5 wt. %, 1–5 wt. % and 1–5 wt. %, respectively. Pt has extensive reference to photocatalytic doping. Ce has been studied as a catalyst for non-photocatalytic reactions, but in this instance, it provides another metal for oxidation reactions. The purpose of the La is to enrich the oxygenating capability of Ce.

Coating of the substrate with the catalyst(s) may be performed by several methods customary in the art, such as by low-temperature sol-gel followed by calcination or drying, or both, chemical or physical vapor deposition methods (CVD and PVD, respectively), chemical vapor infiltration method, low-temperature DC reactive sputtering method, anodization of pure titanium or its alloys, direct oxidation of titanium or tungsten metals or their alloys through heating in oxygenated environments, or through irradiation of organic or aqueous precursors with UV light. Three preferred methods are described in greater detail below.

The first preferred method is low temperature reactive RF magnetron sputtering, a form of PVD, that has not been detailed in previous patents, most probably due to the limitations on its technology. Recent improvements allow for more controlled coatings that are applied in a cylindrical versus a planar cathode. The process parameters associated with magnetron sputtering can be controlled to form different morphologies that cannot be attained through the sol-gel or other methods common in the art. A desired morphology is columnar versus a porous surface. A columnar surface has repeating "cells" of the catalyst of finite depths. This is important to the surface reactions since the pore diffusion resistance is reduced. Also, the coating is more evenly dispersed since the substrate receives atoms as opposed to particles of the target material. In addition, targets comprised of dopant materials can be sputtered onto the substrate after achieving the desired semiconductor film to provide the desired composition.

The second method is low-temperature sol-gel process followed by drying. This method is discussed in U.S. Pat. No. 5,501,801 issued to Zhang et al and is incorporated herein by reference. The Pt, Ce, and La can be photo-reduced (Reference U.S. Pat. No. 4,303,486, Bard et al) onto the resulting sol-gel produced titania. Note that the Bard et al patent does not discuss Ce or La. Pt can be supplied as any aqueous or crystalline form. The Ce and La can be supplied in their respective solution or crystalline forms. Preferred forms are acetate, sulfate, nitrate or chloride.

The third preferred method is irradiation of a fluid composition containing one or all of the photocatalytic constituents, i.e. $TiO_2$, Pt, Ce or La. This method is provided in U.S. Pat. No. 5,593,737 (Meinzer et al). An apparatus is subjected to a conditioned solution containing titanium dioxide powder and UV illumination to form the titanium dioxide layer onto the apparatus surface. This patent discusses only titanium dioxide. The subject method involves either commercially produced $TiO_2$ powders or sol-gel formed $TiO_2$ powders that are doped with Pt, Ce, and La via photoreduction as previously addressed. The $TiO_2$ powders are preferred to be 70–100% anatase with the balance rutile or amorphous, or both. In addition, the subject method uses the standard UV chamber to allow for in-situ coating without the need for separate equipment for coating application. In addition, the subject apparatus may be re-coated (re-generated) in-situ after a designated period without the need to be removed from the UV chamber.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A photolytic reaction enhancement device for the purification of fluids and adapted for use in a light reaction chamber containing at least one light source, said enhancement device comprising: a plurality of fluid permeable panels each having an aperture for the slidable reception of the light source there through; said panels being hingedly connected to one another in series and in accordion-shaped fashion; said panels being adjustably spaced apart along the length of the light source and capable of being oriented at an infinite number of angles relative to the light source to direct greater volumes of fluid within the chamber in close proximity to the light source where reactivity is the greatest.

2. The photolytic reaction enhancement device of claim 1, wherein said plurality of permeable panels are comprised of at least one material selected from the group consisting of: a metal, ceramic, glass, and polymer.

3. The photolytic reaction enhancement device of claim 2, wherein said at least one material selected from the group consisting of: a metal, ceramic, glass, or polymer, is adapted with micropores, channels, or conduits to receive at least one of an oxidizing agent, a reducing agent, or a pH control agent.

4. The photolytic reaction enhancement device of claim 1, wherein said plurality of permeable panels are comprised of a corrosion-resistant metal or metal alloy selected from the group consisting of aluminum, stainless steel, nickel, tantalum, titanium and zirconium.

5. The photolytic reaction enhancement device of claim 1, wherein said plurality of permeable panels are comprised of either titanium or tungsten in pure or alloyed form, and oxidized or anodized to form a titanium dioxide or tungsten oxide layer, respectively.

6. The photolytic reaction enhancement device of claim 1, wherein said plurality of permeable panels further include turbulence enhancement means.

7. A photocatalytic reaction enhancement device adapted for use in a light reaction chamber containing at least one light source, said enhancement device comprising: a plurality of fluid permeable panels each having an aperture for the slidable reception of the light source there through; said panels being hingedly connected to one another in series and in accordion-shaped fashion; said panels being adjustably spaced apart along the length of the light source and capable of being oriented at an infinite number of angles relative to the light source to direct greater volumes of fluid within the chamber in close proximity to the light source; said panels being coated with a photocatalyst.

8. The photocatalytic reaction enhancement device of claim 7, wherein said plurality of permeable panels are comprised of at least one material selected from the group consisting of: a metal, ceramic, glass, and polymer.

9. The photocatalytic reaction enhancement device of claim 8, wherein said at least one material selected from the group consisting of: a metal, ceramic, glass, or polymer, is adapted with micropores, channels, or conduits to receive at least one of an oxidizing agent, a reducing agent, and a pH control agent.

10. The photocatalytic reaction enhancement device of claim 7, wherein said plurality of permeable panels are comprised of a corrosion-resistant metal or metal alloy selected from the group consisting of aluminum, stainless steel, nickel, tantalum, titanium and zirconium.

11. The photocatalytic reaction enhancement device of claim 7, wherein said plurality of permeable panels are comprised of either titanium or tungsten in pure or alloyed form, and oxidized or anodized to form a titanium dioxide or tungsten oxide layer, respectively.

12. The photocatalytic reaction enhancement device of claim 7, wherein said plurality Of permeable panels further include turbulence enhancement means.

13. The photocatalytic reaction enhancement device of claim 7, wherein said photocatalyst is capable of being activated by light sources having a wave length in the 100–400 nm range, said photocatalyst being comprised of: a semiconductor material selected from the group consisting of $TiO_2$, $ZnO$, $WO_3$, $CdS$, $Fe_2O_3$, $MnO_2$, $CeO_2$, $CuO$, and $RTiO_3$ compounds where R is Sr, Ba, Ca, Al or Mg; said semiconductor material being doped with 1–5 wt. % platinum (Pt), 1–5 wt. % cerium (Ce), and 1–5 wt. % lanthanum (La).

14. The photocatalytic reaction enhancement device of claim 7, wherein said photocatalyst is comprised of $TiO_2$ doped with 1–5 wt. % platinum (Pt), 1–5 wt. % cerium (Ce), and 1–5 wt. % lanthanum (La); said $TiO_2$ being comprised of at least 50% anatase titanium dioxide crystal with the balance either rutile and/or amorphous.

15. The photocatalytic reaction enhancement device of claim 13, wherein said photocatalyst is:

a) metallized with at least one metal from the group consisting of; Pt, Pd, Au, Ag, Re, Rh, Ru, Fe, Cu, Bi, Ta, Ti, Ni, Mn, V, Cr, Y, Sr, Li, Co, Nb, Mo, Zn, Sn, Sb and Al; and/or b) doped with at least one of the f-Transition elements selected from the Lanthanide or Actinide series.

16. The photocatalytic reaction enhancement device of claim 14, wherein said photocatalyst is:

a) metallized with at least one metal from the group consisting of: Pt, Pd, Au, Ag, Re, Rh, Ru, Fe, Cu, Bi, Ta, Ti, Ni, Mn, V, Cr, Y, Sr, Li, Co, Nb, Mo, Zn, Sn, Sb and Al; and/or b) coped with at least one the f-Transition elements selected from the Lanthanide or Actinide series, namely Ce, La, Nd and Gd.

* * * * *